United States Patent [19]

Smagala-Romanoff

[11] 4,184,148

[45] Jan. 15, 1980

[54] IDENTIFICATION DEVICES AND SYSTEMS

[75] Inventor: Edward A. Smagala-Romanoff, Edina, Minn.

[73] Assignee: ID Code Industries, Inc., Minneapolis, Minn.

[21] Appl. No.: 762,299

[22] Filed: Jan. 25, 1977

Related U.S. Application Data

[63] Continuation of Ser. No. 579,912, May 22, 1975.

[51] Int. Cl.[2] ...................... B42D 15/02; G06K 19/06; H04Q 9/00

[52] U.S. Cl. ..................................... 340/149 A; 283/7; 235/494

[58] Field of Search ........................ 340/149 R, 149 A; 235/61.7 A, 61.12 N, 61.7 B; 283/6, 7, 8, 11, 17; 179/2 CA

[56] References Cited

U.S. PATENT DOCUMENTS

| | | | |
|---|---|---|---|
| 1,556,895 | 10/1925 | Ayers | 283/7 |
| 1,813,257 | 7/1931 | Rand, Jr. | 283/7 |
| 2,298,487 | 10/1942 | Kiner | 179/2 CA |
| 3,609,690 | 9/1971 | Nissman | 340/149 R |
| 3,665,162 | 5/1972 | Yamamoto et al. | 179/2 CA |
| 3,718,349 | 2/1973 | Small | 283/6 X |
| 3,719,801 | 3/1973 | Drexler | 235/61.12 N |
| 3,794,813 | 2/1974 | Spetz | 340/149 A |

FOREIGN PATENT DOCUMENTS 695673 10/1964 Canada ............................ 235/61.12 N

OTHER PUBLICATIONS

IBM Technical Disclosure Bulletin, vol. 13, No. 7, Dec. 1970, pp. 1910, 1911, "Prevention of Unauthorized Use of Credit Card," C. A. Gaston.

*Primary Examiner*—Donald J. Yusko
*Attorney, Agent, or Firm*—Maurice R. Boiteau

[57] ABSTRACT

There are disclosed in the present application devices and systems for providing proof of identity of a client by the client's ability to select predetermined digits from a multiplicity of digits randomly arranged in a grid of a plurality of sets of digits in which each set consists of several digits. A multiplicity of grids is provided each with a different order and arrangement of digits on a suitable surface so that the client, in order to establish his identity, is required to select the digits from one of the large number of grids. The manner in which the client selects his identifying digits is by being given in advance a positional code from which he determines the correct digits by their locations in the grid. The accuracy of the client's answer is checked against a register listing the client's social security number and an identification of the specific grids together with required identification numbers relating to the specific grids.

9 Claims, 4 Drawing Figures

Figure 4:
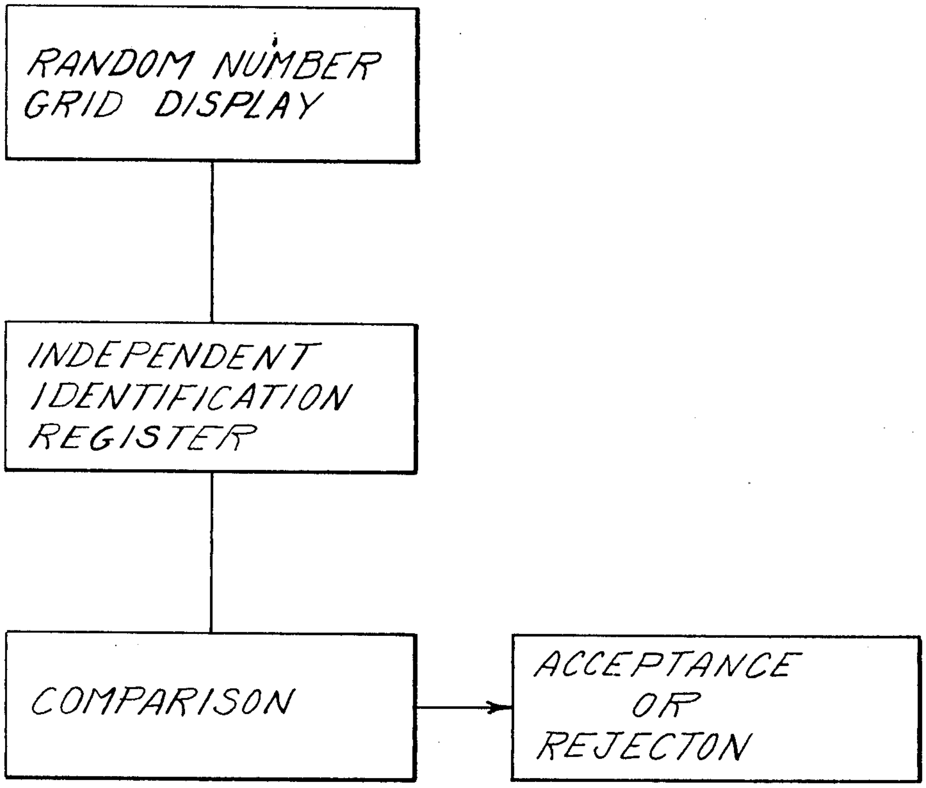

*Fig. 1*
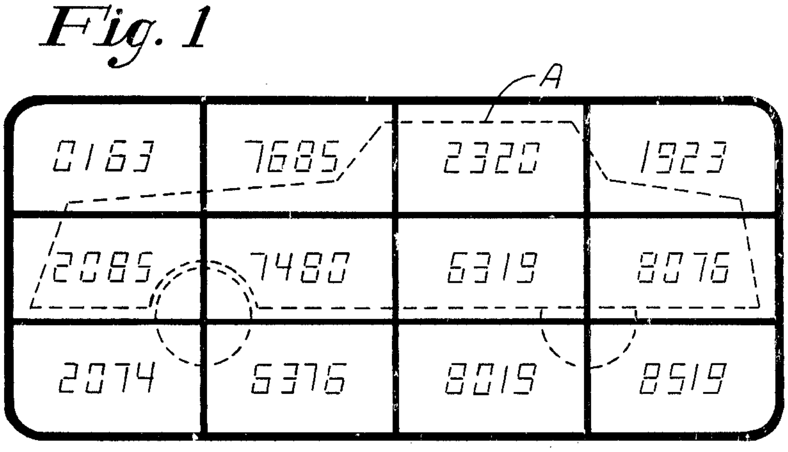
*Fig. 2*
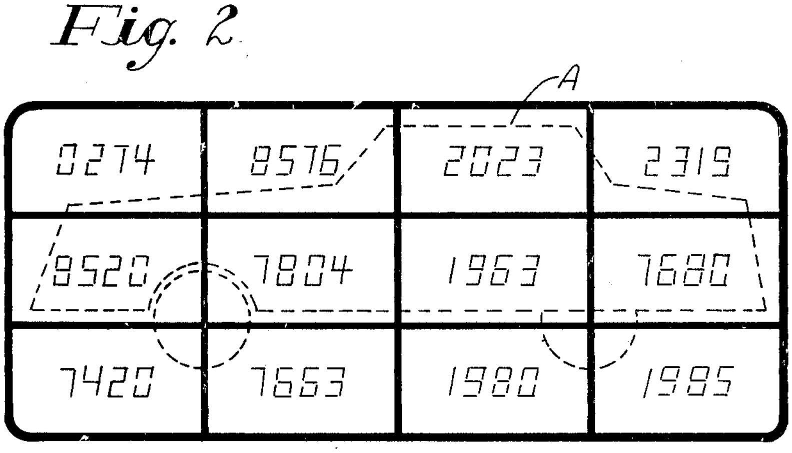
*Fig. 3*
| Social Security No. | Grid No. | Identification No. |
|---|---|---|
| 035 12 6981 | 01 | 26 |
| 035 12 6981 | 02 | 80 |
| 035 12 6982 | 01 | 32 |
| 035 12 6982 | 02 | 97 |

IDENTIFICATION DEVICES AND SYSTEMS

This is a continuation of application Ser. No. 579,912, filed May 22, 1975.

The present invention relates generally to improvements in devices and systems for the positive personal identification of a client for a subscriber, but more particularly the invention relates to improvements in personal identification accomplished without the use of cards or other devices which must be carried by the client and are thus subject to loss, theft or compromise.

The establishment of one's identity is often either required or desirable sometimes as frequently as several times each day. When the identity is to be established as part of a business transaction, reliance is often placed upon the use of credit cards which in recent years have proliferated in numbers and types to such a point that their existence imposes a serious cost upon the merchant and the severe risk of loss upon the client. The cost to the business man and the risk to the client are in large measure due to the need of the credit card as the key to the entire system. In order to reduce these losses and risks some credit cards include the client's photograph or fingerprint but even these expedients although more expensive in the issuance of large numbers of credit cards are sometimes counter-productive in that the cards are more readily accepted as genuine whereas such cards are subject to alteration, substitution, counterfeiting and other forms of compromise.

Identification is either essential or beneficial not only for business purposes such as the extension of credit and the cashing of checks but for admittance to sensitive security areas where entry must be controlled. Similarly, reliable identification is frequently required before a client gains access to a safe deposit box without being otherwise known.

Ideal identification may be somewhat universal among a multiplicity of institutions and locations with indefinite, relatively permanent continuation of the service or alternatively may be provided briefly and simply in a single location, for a limited purpose and be of very short duration at little direct expense.

It is accordingly an object of the present invention to improve both the effectiveness and overall economy attending the identification of clients to subscriber institutions and locations.

A more particular object is to avoid for the client the burden of carrying a multiplicity of separate credit cards and the serious damage resulting from their loss or theft.

A more specific object is to provide a means by which the identity of a person may be established verbally such as by telephone and without the need for the fixed identification numbers which are usually embossed on credit cards.

In the achievements of the foregoing objects, a feature of the invention relates to conveniently identifiable grids of number sets printed or otherwise displayed upon appropriate surfaces and in which each digit occupies a predetermined position in the grid. memory aids and for ease in location of individual digits according to a positional key, the numbers of the grid are broken up into sets each of several digits. In addition, an outline of a common object may be superimposed over the grid to assist further in the location of the appropriate digits.

Another feature relates to a register in which the client is independently identified as by his social security number together with appropriate answers based on his individual positional key to predetermined and identified grids of numbers.

The foregoing objects and features together with many advantages of the present invention will be readily understood from the following detailed description of illustrative embodiments taken in connection with the accompanying drawings in which:

FIGS. 1 and 2 are representations of typical, different grids of numbers to be submitted to a client for purposes of identifying himself in accordance with the invention; and FIG. 3 is a fragmentary view of a portion of a register containing identification information relating to different clients; and FIG. 4 is a block diagram illustrating the identification procedures according to the present invention.

Turning now to the drawings, particularly FIGS. 1 and 2, there is shown a pair of grids of numbers to be used for identification purposes. Each grid includes forty eight digits separated into twelve sets of four digits arranged in three horizontal rows each consisting of four sets. Although only two grids are shown for purposes of illustration of the principle of the invention, it is contemplated that a multiplicity of different grids perhaps as many as fifty or more would appropriately be employed in order to obtain a greater degree of certainty and to prevent chance breaking of the positional key where security is important. The grids of FIGS. 1 and 2 are identified for purposes of communication and record keeping by the first two digits in the first set in the upper left hand corner of each grid as 01 and 02 respectively. In addition, to serve as a memory aid, there is superimposed in dash lines and preferably in a contrasting color, on each grid the outline of an automobile A to assist the client as will be further explained.

Shown in FIG. 3 is a series of individual entries in a register showing the Social Security number of a client and the number of a grid together with the correct identification number which the client must provide in order to establish his identity in response to being presented with a specific grid. The Social Security number happens to be a convenient, generally universal form of independent identification which is readily classifiable and recordable. The number assigned to a client need not be his Social Security number but may be another arbitrary number given to him just as long as there is no duplication of numbers in the register. Alternatively, the identification could be a classifiable characteristic such as a fingerprint or a voice print but a number such as the social security number is both convenient and adequate for the intended purpose. Appearing on the register in the second column entitled "grid number" is the number comprising the first two digits in the upper left hand corner of the grid as already indicated. In the third column is the identification number which must be supplied by the client at the subscriber location in order to prove his identity.

The method by which the client proves his identity is by providing two digits from a grid which is presented to him, either one of those shown in FIGS. 1 and 2 or any of a multiplicity of similar grids. His selection of the corect digits is based on a positional key with which the client is provided when he joins the program as a client. Thus, the first client whose Social Security number is 035-12-6981, has been given the positional key of the first digit in the second row and the last digit in the second row, the two digits occuring in the first and fourth sets of the second row. With this key, the client upon being shown grid 01 provides the identification number 26 and upon being presented grid 02 provides the identification number 80. A second client having the Social Security number 035-12-6982 has been given the positional key of the last digit in the first line, the fourth digit in the fourth set, and the first digit in the third line, the first digit in the first set of the third line. When he is presented with grid 01, the identification number which he provides is 32 and when shown grid 02, he gives the identification number 97. It is readily appreciated that a very large number of grids may be similarly constructed to provide different tests which a client might be expected to pass alternatively to establish his identity. There is accordingly little likelihood that a potential impostor who in some way obtains the correct answer given by a client in response to a specific grid would in attempting to pass himself off as the client be presented with the same grid for a later identification.

The large number of digits, forty-eight, together with the frequent repetition of digits creates a difficult problem for one who would try to decipher the positional key from the identification number given by a client in response to a specific grid. Thus, a potential impostor who gained information that the client with Social Security number 035-12-6981 when presented with grid 01, gave the identification number 26, would have an extremely difficult problem in determining the positional key even though he were already aware of the fact that the identification number depends on digit position for its correct solution. This difficulty is realized from the fact that in grid 01, for example, the various digits and their frequency of occurrence are as follows:

| digit | occurrence | digit | occurrence |
|---|---|---|---|
| 0 | 7 | 5 | 3 |
| 1 | 5 | 6 | 5 |
| 2 | 4 | 7 | 5 |
| 3 | 5 | 8 | 6 |
| 4 | 2 | 9 | 4 |

It is seen that the identification number 26 may be derived from twenty positional combinations, the product of four 2's and five 6's.

The present invention contemplates a large number of different ways in which the present invention may be employed. For example, if the holder of Serial Number 035-12-6981 wished to establish his identity for the purpose of obtaining credit, cashing a check, gaining entry to a secured area or access to a safety deposit box, he would apply to a suscriber location, identify himself as John J. Smith, Social Security number 035-12-6981 and typically be shown grid 01 in response to which he would give his identification number 26. If he failed to give the number 26, he would be shown grid 02 and be given another opportunity to establish his identity by giving the identification number 80. In any event, the number given by the client to the participating location would be checked in the register against the Social Security and the grid number and once verified would establish his identity as John J. Smith.

Present practice for making credit card calls consists of telling the operator a credit card number which is usually the holder's telephone number followed by a literal and numerical suffix which is changed only once a year or when the number has been lost or misused. A variation of the present invention for purposes of identifying a credit card caller is to supply him with ten or fifteen different number grids instead of a credit card and a positional key correlated to his telephone number. Thus, when the customer tells the operator that he wishes to make a credit card call, he is typically directed to grid 12 and requested to give a two digit identification number. The caller's answer may be checked with a central ledger correlating his telephone number, the grid number and the correct identification number. If such information is stored in a computer memory, the identification may be verified very quickly and the customer need not risk the possibility of inconvenience or loss from having his conventional credit card number overheard and fraudulently misapplied by an eavesdropper.

Identification systems according to the invention are extremely flexible and may be tailored in their administration to suit local single businesses, chains of stores or banks or even regional cooperatives of merchants and banks. In the latter case, the ledger may be centrally maintained and identification numbers checked by telephone with a central bureau. For convenience, economy and speed of operation, a computer memory may be employed together with a terminal for interrogating the computer memory and including a screen upon which the grid is displayed.

The automobile outline A assists some persons in remembering their positional key. Such persons might more easily remember their key as the first number under the hood and the last number in the trunk than as specific positions in sets without the assistance of the outline.

The devices, systems and methods already described are not directed to a method of doing business since their sole purpose is the identification of individuals whether or not as part of a business transaction. Although number grids may conveniently be displayed upon screens of computer terminals, the invention may be practiced using printed grids and ledgers. The use of numbers and their comparisons to verify identity does not involve mental steps but comparisons of shapes of numbers which are universally recognized and could be accomplished less quickly and conveniently with geometric shapes, for example. Neither is the selection of digits by position a mental step since this could typically be accomplished by the use of an appropriately perforated mask.

Having thus disclosed my invention, what I claim as new and desire to secure by Letters Patent of the United States is:

1. Apparatus for performing a personal identity check for security purposes at a subscriber location comprising means including a surface upon which one of a multiplicity of possible grids of random digits is displayed, each grid including a plurality of digits each digit occupying a predetermined and identifiable relative position in the grid and means for identifying the grid.

2. Apparatus according to claim 1 further characterized in that each digit occurs in each grid at least twice.

3. Apparatus according to claim 1 further characterized in that each grid includes a plurality of lines in which the digits are arranged in a plurality of spaced apart groups.

4. Apparatus according to claim 3 in which each line of each grid includes four groups each containing four digits.

5. Apparatus according to claim 1 further comprising an overlay of an object outline, the part of which bear a predetermined positional relationship to the various digits of each grid.

6. A system for performing a personal identity check for security purposes at a subscriber location comprising means including a multiplicity of grids each including a plurality of digits occupying predetermined and identifiable relative positions, means for identifying each grid, means of independently identifying the client, the identity of the grid and at least two digits to be supplied by the client from positional relationships of digits in the grid.

7. A system according to claim 19 further characterized in that the independent identification of the client is his Social Security number.

8. A method of performing a personal identity check for security purposes comprising the steps of: first providing each client with a positional code consisting of at least two predetermined positions occupied by digits required for establishing his identity in response to the presentation of any grid of digits; making available for inspection by a person of an alleged identity a grid of digits selected by a representative of a participating location from a multiplicity of different grids each comprising a plurality of each of a number of different digits distributed and arranged so that the position of each digit can be identified in terms of a positional code known to the person of the alleged identity; receiving from the person being checked digits appearing at the positions represented by his positional code in the selected grid; and comparing the given digits for the specific grid with a record in which the positional code of the client of the alleged identity is recorded, together with an independent identification, in terms of the digits appearing on each of the grids at the positions represented by the code previously provided to him.

9. A method according to claim 8 further characterized in that the client's independent identification consists of his Social Security number.

* * * * *